Dec. 13, 1938.  W. ROHN  2,139,853
METHOD OF MAKING STEEL
Filed April 24, 1937
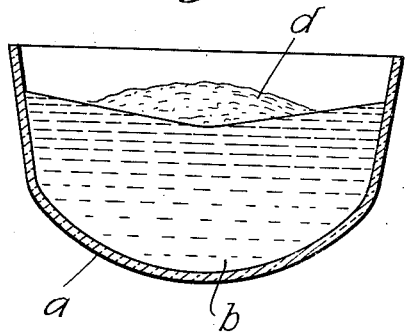
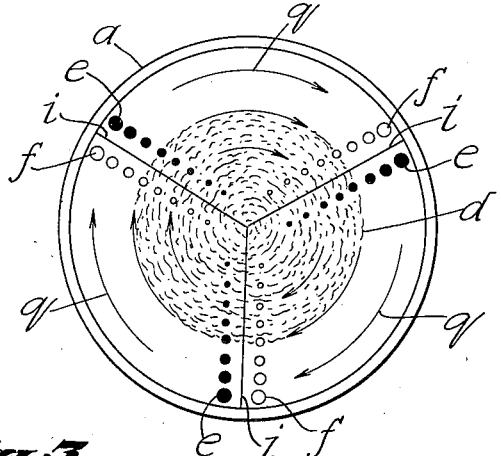
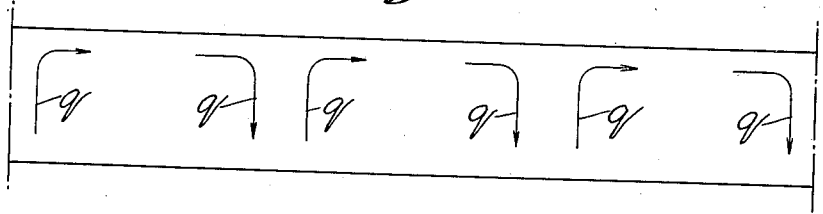
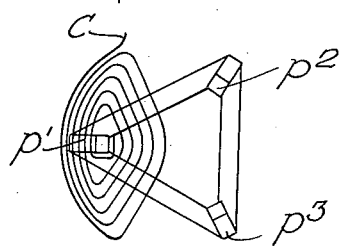
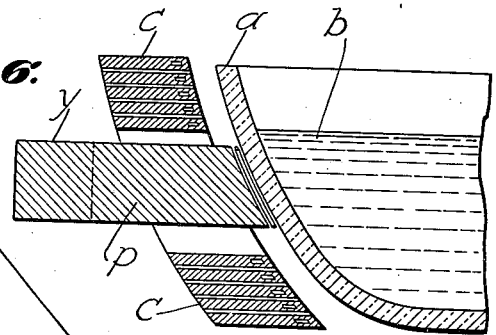
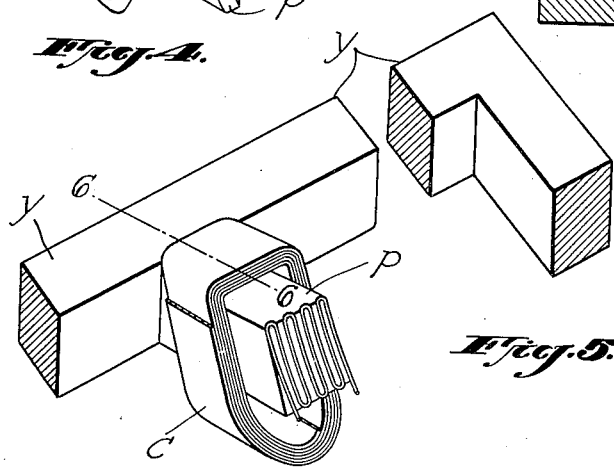
INVENTOR.
WILHELM ROHN.
BY
ATTORNEYS Patented Dec. 13, 1938

2,139,853

UNITED STATES PATENT OFFICE 2,139,853

METHOD OF MAKING STEEL

Wilhelm Rohn, Hanau-on-the-Main, Germany, assignor to Heraeus-Vacuumschmelze A. G., Hanau-on-the-Main, Germany, a German company Application April 24, 1937, Serial No. 138,851
In Germany July 8, 1933

8 Claims. (Cl. 75—11)

The invention relates to a process for making steel in inductively heated electric melting furnaces and is a continuation in part of my prior filed application Serial No. 701,000 filed December 5, 1933 which matured into Patent No. 2,097,344.

The increasing introduction of inductively heated electric metallurgical melting furnaces has shown that the motion in the bath occurring in such melting furnaces has a strong accelerating and assisting action on a number of known metallurgical processes including, inter alia, the reduction of the carbon, sulphur and phosphorus content. This knowledge has assisted materially in the increasing introduction into metallurgical practice of the so-called high frequency furnaces.

In the accompanying drawing, Fig. 1 is a vertical section illustrating one feature of the present invention; Fig. 2 is a plan view of the same with markings thereon further illustrating the same; Fig. 3 is a panorama view of the same; Fig. 4 illustrates diagrammatically one feature of the electric furnace utilized in the practice of the present invention; Fig. 5 is a perspective view of another feature; and Fig. 6 is a sectional view along plane 6—6 of Fig. 5.

Referring to the drawing, in all figures $a$ is the hearth, $b$ is the molten metal bath, $c$—$c$ are the induction coils for energizing the bath, $y$ is the yoke and $p$ is the magnetic pole piece. Arrows $q$ indicate the circulatory motions imparted to the bath by reason of the specific furnace construction and $d$ indicates the slag with which it is desired to react the bath $b$ in accordance with the present invention.

In a high frequency furnace known per se the molten metal rises in the center of the furnace, flows outwardly towards the periphery and there flows downwardly and laminarily along the lining. The slag provided on the surface of the bath for exerting metallurgical reactions is accordingly driven to the edge of the fused metal and collects for the greater part at the lining of the furnace. Insofar as the slag is able to react with the lining this collection of the slag leads to a comparatively rapid erosion of the lining at the points at which the slag comes into contact therewith.

In itself it would be desirable to make provision for the slag to be held as far as possible away from the walls of the furnace, i. e., from the lining; further it would be desirable to make the motion in the bath, which in the induction furnaces hitherto known is essentially laminar, so violent and so turbulent that the bath does not merely move continuously past the slag lying quietly on its surface but that the slag is stirred into the bath as an emulsion.

The features which are indicated above as being desirable are attained if the axes of the induction coils are not arranged vertically and concentrically with respect to the bath as hitherto customary in high frequency furnaces but are disposed primarily radially and horizontally. A further improvement is attained if the metallurgical melting furnace heated by induction is supplied not with single or two phase alternating current but with three-phase current. The mode of operation of such arrangements is indicated in Figs. 1, 2 and 3.

In Fig. 1 the induction coils, $c$, $c$ which are diagrammatically shown in Fig. 4 have nearly horizontally and radially directed axes. In consequence of the action of the rotating field the entire bath is caused to rotate about a vertical axis. This has the effect that the bath is at a higher level at the periphery than at the center so that in consequence the slag $d$ present on the surface of the bath collects primarily at the center of the bath and thus is kept from a too intimate contact with the lining.

In Fig. 2, which again shows a plan view of the surface of the bath in a furnace according to the invention, the points at which the bath moves upwardly from below are shown by solid circles $e$ whereas the points at which the bath flows downwardly are indicated by open circles $f$. This illustration is based on a furnace with three poles. In Fig. 4, which is drawn on a smaller scale than Figs. 1 and 2, $g$ is a triangular yoke $y$ with the three poles $p'$, $p^2$, $p^3$ these elements of the furnace not being shown in Figs. 1 and 2. It is seen that in consequence of the arrangement of the induction coils, $c$, with nearly horizontal radial axes there are rising and falling motions directly adjacent one another in the horizontally rotating bath about a plurality of horizontal axes equal to the number of coils $c$, which gives rise to a strong turbulence of the horizontally rotating flow of the bath and in consequence the bath does not merely flow beneath the slag but tears the slag directly into small particles and stirs them into the bath as an emulsion. The result of this is an extremely great acceleration of all metallurgical reactions with a consequent relatively short reaction time period. The degree of turbulence necessary in the bath to obtain emulsification of the slag in the bath and the desired reaction temperatures in the bath may be gained through the proper control and regulation over the coil windings and current input substantially as described in my Patent No. 1,983,242.

The panorama view of Fig. 3 is shown on a somewhat smaller scale than Fig. 2 and the motions in the bath are again indicated by arrows $q$.

The idea of furnishing induction furnaces with coils the axes of which are arranged radially and predominantly horizontal is not novel. When in spite of this the above described phenomena and motions in the bath have not hitherto been disclosed and utilized, this may perhaps be attributed principally to the fact that such furnaces although proposed on paper many times have not yet been utilized in practical operation at all. The study of the phenomena referred to in a three-pole three phase furnace constructed as described and claimed in my prior Patent No. 1,983,242, Figs. 7 and 8 of the drawings of said patent being reproduced as Figs. 5 and 6 of the present application, containing about 1600 kilos has shown that the difference in level between the center of the bath and the edge of the bath can amount to 10 to 12 cm. and has the effect that the slag accumulates principally in the center of the bath. Along the three lines $i$ in Fig. 2, at which upwardly directed and downwardly directed motions are immediately adjacent one another in the bath there are differences in level of from 4 to 6 cm. so that at these points there is the appearance of a standing breaker. Quantities of slag of from 80 to 100 kilos are in this way drawn under the surface of the bath so that the entire surface of the bath exhibits a metallic appearance and there are no accumulations of slag on the surface at all. The extremely violent motion of the bath, the intensity of which has not been attained in any induction furnace hitherto constructed, renders it possible to reduce the carbon content of a charge of 1600 kilos from 1.0 to 0.02% of carbon within 30 to 50 minutes in the furnace described, or to reduce the phosphorus content from 0.15 to 0.003% or to reduce the sulphur content from 0.1 to 0.003%, within the same time.

In the following the direct production of steel from ore in a furnace which in accordance with the invention is operated with coils with radially arranged axes will be described as an example of a further use.

In order to produce a steel with a desired low carbon content directly from iron ore or iron oxide, in one single operation, I introduce into a bath of molten steel one of these oxide materials (with or without additions of other carbon reducible metal oxides) admixed with such a proportion of carbon that the oxide will be effectively reduced to metal and the molten metal bath after such reduction will have the desired final carbon content. In this operation the quantity of steel originally present appropriately serves simultaneously as a source of heat. On first charging the furnace I may either use a liquid steel bath which already has the same composition as the finished product is to have, or else I may use any molten iron, such as pig iron and determine the quantities of the metal oxide (iron oxide or iron ore) and of the carbon which is to be added, taking into account the carbon content already present in the metal bath. In this way the final molten metal product can be assured of containing just the prescribed or desired amount of carbon. Subsequently to decarburizing the metal bath in the manner described, it is necessary to remove from the bath the remaining or non-reduced metal oxides, and the silica, phosphorus and sulphur compounds present therein. This I accomplish by adding to the bath various fluxing ingredients such as lime (CaO) which on being emulsified in the molten metal will rapidly and efficiently combine with these undesired compounds forming therewith a fluid slag composition. These fluxing materials may, however, be added at the same time the metal oxide and carbon is added if desired.

In the manner above outlined it is possible to obtain a steel of the desired composition directly from ore or oxide utilizing a relatively small bath of molten metal without the circuitous steps hitherto usual of producing pig iron from ore in a blast furnace and subjecting this pig iron to a further refining and purifying operation in another type of furnace or converter.

The process affords particular advantages in the direct treatment of slick and fine ores. Slick or fine ores cannot be directly introduced into a blast furnace as they completely fill the interstices between the coke and thus prevent the passage of the blast. Consequently when operating in a blast furnace the slick or the fine ore must first be briquetted. For example, according to the Dwight-Lloyd process fine ore and carbon are mixed and sintered before they can be introduced into the blast furnace. In the process according to the application on the other hand pulverulent components can be introduced in a particularly advantageous manner because such components distribute themselves in a particularly good and uniform manner in the bath so that the time of the reaction is particularly short. It is advantageous if not only the ore or oxide but also the carbon is utilized in a finely divided form.

In the practice of this invention it is preferable to first add the carbon and silicon reducible metal oxides with or without further additions of carbon to the molten metal bath and by emulsification of the same therein to lower the carbon content of the bath to the desired low level before adding the fluxing materials to the bath. In which case the fluxing materials added may comprise any of the heretofore employed flux materials adapted to remove silica, phosphorus and sulphur compounds from the low carbon molten metal bath, such as for example, a strongly basic oxidizing slag. Various addition agents to increase the fluidity of the slag may be made if desired or necessary in the practice of the emulsification feature of the present invention.

The furnace structure illustrated in Figs. 5 and 6 being fully described in my above identified patent need not be further described herein beyond identifying the various elements thereof to conform with the above description of the present invention.

From the above description it is apparent that many modifications and adaptions may be made therein without departing essentially from the nature and scope as may be included within the following claims:

What I claim is:

1. The method of making steel which comprises forming a molten iron bath, vigorously and turbulently stirring the bath while heating the same, adding thereto metal oxides, carbon and fluxing materials in such relative proportions one to the other as to produce on reaction with each other and with the impurities in the bath a steel of desired composition, and continuing the heating with vigorous stirring until the said reactions have been completed.

2. The method of making steel which comprises forming a molten pig iron bath, vigorously and turbulently stirring the bath while heating the same, adding thereto metal oxides, carbon and fluxing materials in such relative proportions as to produce on reacting with each other and with the impurities in the bath a steel of desired composition, and continuing the heating with vigorous stirring until the said reactions have been completed.

3. The method of producing steel which comprises forming a molten bath of iron, adding to the bath a mixture of metal oxides and carbon in such relative amounts taken with the carbon content in the iron that said metal oxides will be reduced by said carbon and after reduction of said oxides the carbon content of the said bath will approximate a desired percentage, heating the bath with vigorous stirring at least sufficient to thoroughly and uniformly distribute the said carbon and oxides throughout the bath for a time interval adapted to obtain substantially complete reduction of said oxides and a lowering of the carbon content to the desired percentage, adding fluxing materials to said bath in such amount as to form a readily fusible slag with the unreduced metal oxides, the silica and the phosphorus and sulphur compounds present therein, continuing the heating with vigorous stirring until the said bath is substantially freed from the said metal oxides, silica, sulphur and phosphorus and said impurities contained in said slag, and then separating the slag from the metal of the bath.

4. In the method of claim 3, wherein the heating and vigorous stirring is accomplished by induced electric currents applied to the bath about a plurality of nearly horizontal radial axes.

5. The method of manufacturing steel which comprises forming a molten bath of impure iron, adding thereto successive increments of iron ore and carbon, heating said bath with vigorous stirring at least sufficient to thoroughly and uniformly distribute the said ore and carbon throughout the bath, continuing the heating with vigorous stirring and the additions of said ore and carbon until the bath volume is increased to a desired maximum, adding fluxing materials to the said bath in such amount as to form a fusible slag with the impurities of ore, silica, gangue and the sulphur and phosphorus compounds in the said bath, continuing the heating with vigorous stirring for a time interval adapted to complete the forming of said slag and thereafter separating the metal of the bath from said slag.

6. The method of claim 5, wherein said ore is reduced to fine particle size before addition to the said bath.

7. The method of claim 5, wherein said fluxing materials are added with the ore and carbon.

8. The method of claim 5, wherein the heating and vigorous stirring is accomplished by induced electric currents applied to the bath about a plurality of nearly horizontal radial axes.

WILHELM ROHN.